United States Patent
Schlaffer-Zannoth

(10) Patent No.: US 9,209,680 B2
(45) Date of Patent: Dec. 8, 2015

(54) CIRCUIT FOR PROVIDING NEGATIVE VOLTAGES WITH SELECTABLE CHARGE PUMP OR BUCK-BOOST OPERATING MODE

(75) Inventor: Andreas Schlaffer-Zannoth, Neubiberg (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 809 days.

(21) Appl. No.: 12/432,499

(22) Filed: Apr. 29, 2009

(65) Prior Publication Data

US 2010/0277156 A1 Nov. 4, 2010

(51) Int. Cl.
*G05F 1/10* (2006.01)
*H02M 3/07* (2006.01)
*H02M 3/155* (2006.01)

(52) U.S. Cl.
CPC ................ *H02M 3/07* (2013.01); *H02M 3/155* (2013.01); *H02M 2003/071* (2013.01)

(58) Field of Classification Search
USPC ......................................... 323/318, 259, 344
See application file for complete search history.

(56) References Cited

U.S. PATENT DOCUMENTS

| | | | | |
|---|---|---|---|---|
| 5,821,701 A * | 10/1998 | Teggatz et al. | ................. | 315/307 |
| 6,917,240 B2 * | 7/2005 | Trafton et al. | ................. | 327/540 |
| 7,602,167 B2 * | 10/2009 | Trafton et al. | ................. | 323/284 |
| 7,633,276 B2 * | 12/2009 | Ferianz et al. | ................. | 323/271 |
| 2003/0151448 A1 * | 8/2003 | Fujiyama et al. | ............. | 327/536 |
| 2004/0263231 A1 | 12/2004 | Trafton et al. | | |
| 2005/0121980 A1 * | 6/2005 | Bruwer | ...................... | 307/87 |
| 2007/0279021 A1 * | 12/2007 | Yanagida et al. | ............. | 323/272 |
| 2007/0285065 A1 * | 12/2007 | Summit et al. | ................. | 323/225 |
| 2008/0116855 A1 * | 5/2008 | Augesky et al. | ............. | 320/166 |
| 2008/0150619 A1 * | 6/2008 | Lesso et al. | .................... | 327/536 |
| 2008/0309291 A1 * | 12/2008 | Cha | ............................... | 320/139 |
| 2009/0059630 A1 * | 3/2009 | Williams | ........................ | 363/60 |
| 2009/0179584 A1 * | 7/2009 | Miyanaga | ..................... | 315/291 |
| 2009/0315615 A1 * | 12/2009 | Likhterov | ..................... | 327/536 |
| 2010/0308890 A1 * | 12/2010 | Schlueter et al. | ............. | 327/383 |

* cited by examiner

*Primary Examiner* — Emily P Pham
(74) *Attorney, Agent, or Firm* — SpryIP, LLC

(57) ABSTRACT

Circuits, arrangements and systems may provide for configuring a portion of an integrated circuit to receive an electrical component, and configuring the integrated circuit to operate in a first mode when the electrical component is a first electrical component or in a second mode when the electrical component is a second electrical component.

19 Claims, 3 Drawing Sheets ical circuit receives a capacitor. In this case, the electrical circuit is configured to operate as a charge pump type DC/DC converter. In another example, the first portion of the electrical circuit receives an inductor instead. Now, the electrical circuit is configured to operate as a buck-boost type DC/DC converter. Thus, in these examples, the circuit is configured to operate as either a charge pump type DC/DC converter or a buck-boost type DC/DC converter based on the portion of the electrical circuit receiving either a capacitor or an inductor respectively.

CIRCUIT FOR PROVIDING NEGATIVE VOLTAGES WITH SELECTABLE CHARGE PUMP OR BUCK-BOOST OPERATING MODE

BACKGROUND

A negative voltage may be used to supply power to portions of an embedded system. At least two common circuit schemes exist for generating a negative voltage supply. One scheme for generating a negative voltage supply is a charge pump type DC/DC converter. A charge pump is generally less expensive to implement, but tends to be less efficient than some other schemes. Another common scheme for generating a negative voltage supply is a buck-boost type DC/DC converter. A buck-boost may be somewhat more expensive than some other schemes, but tends to be more power efficient than many other schemes.

Often, the decision of which scheme will be used to generate a negative voltage supply in a system is made earlier on, frequently at the concept phase of a project. As the project progresses, the design becomes more fixed around the choice made and becomes less flexible to change. This inflexibility may lead to increased project risk and a reduced ability to adapt to changing project priorities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
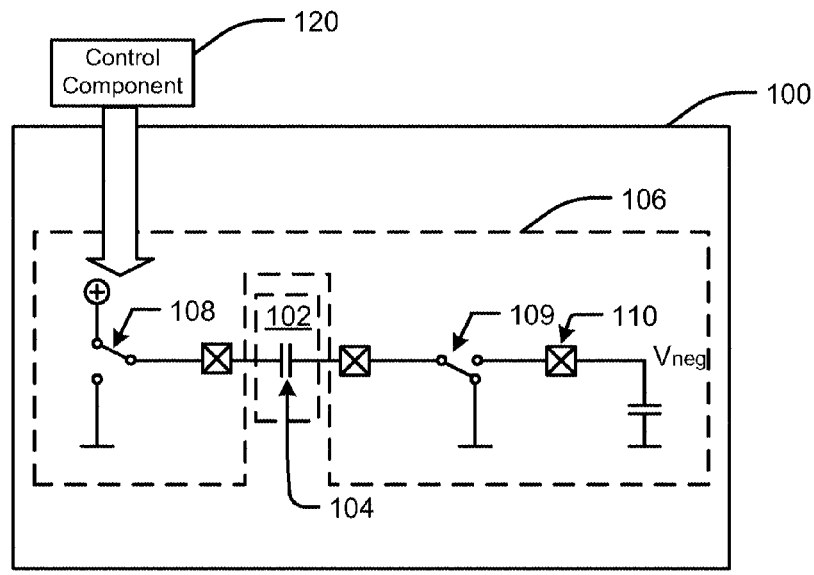
FIG. 1A shows a schematic illustration of an example of the system and method according to a first mode.

Exemplary implementations are explained in more detail below using a plurality of examples. Although various implementations and examples are discussed here and below, further implementations and examples are possible by combining the features and elements of individual ones.

Exemplary implementations of electrical circuits and systems are disclosed for providing a configurable negative voltage supply. Example systems include an electrical circuit configured to generate a negative voltage. In another example, the electrical circuit may be configured to generate a positive voltage.

In one implementation, a first portion of the exemplary electrical circuit is configured to receive an electrical component. The electrical component may be a capacitor, an inductor, or other suitable electrical component. Another portion of the electrical circuit contains at least one switch that is configured to activate the electrical component. The electrical circuit is configured to operate in one of at least two modes, based on the electrical component that is received by the portion of the circuit.

In one example, the first portion of the electrical circuit receives a capacitor. In this case, the electrical circuit is configured to operate as a charge pump type DC/DC converter. In another example, the first portion of the electrical circuit receives an inductor instead. Now, the electrical circuit is configured to operate as a buck-boost type DC/DC converter. Thus, in these examples, the circuit is configured to operate as either a charge pump type DC/DC converter or a buck-boost type DC/DC converter based on the portion of the electrical circuit receiving either a capacitor or an inductor respectively.

In a further example, an electrical circuit may be configured to operate as a charge pump type DC/DC converter. However, instead of a portion of the electrical circuit receiving a capacitor, the portion of the electrical circuit receives an inductor instead. In one example, the electrical circuit may receive the inductor from a user. Thus, the electrical circuit is adjusted by receiving the inductor, such that now the electrical circuit is configured to operate as a buck-boost type DC/DC converter. In another example, an electrical circuit may be configured to operate as a buck-boost type DC/DC converter. However, instead of a portion of the electrical circuit receiving an inductor, the electrical circuit receives a capacitor instead. In one example, the electrical circuit may receive the capacitor from a user. Thus, the electrical circuit is adjusted by receiving the capacitor, such that now the electrical circuit is configured to operate as a charge pump type DC/DC converter.

Additionally, an example of an electrical circuit that is configured to operate as a charge pump type DC/DC converter may be adjusted to operate as a buck-boost type DC/DC converter, without increasing the number of electrical connection pads used. Further, an example of an electrical circuit that is configured to operate as a buck-boost type DC/DC converter may be adjusted to operate as a charge pump type DC/DC converter, without increasing the number of electrical connection pads used.

An exemplary system that includes a configurable electrical circuit as described in any of the examples above may also include a control component configured to activate a switch used to activate the electrical component. The control component is configured to activate the switch to enable and disable the electrical component according to the mode that the electrical circuit is operating within. For example, if the electrical circuit is configured to operate as a charge pump type DC/DC converter, then the control component is configured to activate the switch to enable and disable the electrical component (a capacitor in this case) according to that mode of operation. Additionally or alternatively, if the electrical circuit is configured to operate as a buck-boost type DC/DC converter, then the control component is configured to activate the switch to enable and disable the electrical component (an inductor in this case) according to that mode of operation.

Exemplary Implementations

Figure 1B:
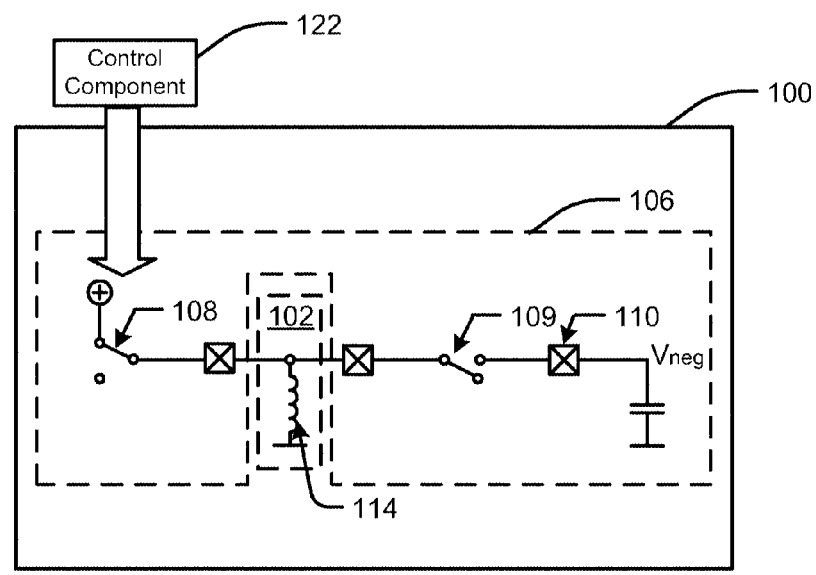
FIG. 1B shows a schematic illustration of an example of the system and method according to a second mode.

FIGS. 1A and 1B show an example of a configurable electrical circuit 100 in two exemplary operating modes. FIG. 1A shows the electrical circuit 100 operating in a first mode, and FIG. 1B shows the electrical circuit 100 operating in a second mode. The electrical circuit 100 is configured to provide a negative voltage supply in both operating modes represented by FIGS. 1A and 1B. The negative voltage output for the circuit 100 is represented at $V_{neg}$ for both operating modes. However, this is not intended as a limitation.

In another example of a configurable electrical circuit 100, the electrical circuit 100 is configured to provide a positive voltage supply in both operating modes.

The circuit 100 is shown in both FIGS. 1A and 1B as having a first portion 102 that is configured to receive an electrical component (e.g. capacitor 104). The first portion 102 is shown as having received a different electrical component in FIG. 1A than in FIG. 1B, resulting in the circuit 100 operating in two different operating modes in the respective figures. In other words, the operating mode of the circuit 100 depends on the electrical component received by the first portion 102.

In FIG. 1A, the electrical component received by the first portion 102 is a capacitor 104. However, in FIG. 1B, the electrical component received by the first portion 102 is an inductor 114. Consequently, when the first portion 102 receives a capacitor 104 as shown in FIG. 1A, the circuit 100 in FIG. 1A is configured to operate as a charge pump type DC/DC converter. When the first portion 102 receives an inductor 114, as shown in FIG. 1B, the circuit 100 in FIG. 1B is configured to operate as a buck-boost type DC/DC converter.

Thus, in these examples, the electrical circuit 100 is configured to operate as either a charge pump type DC/DC converter or a buck-boost type DC/DC converter based on the first portion 102 receiving either a capacitor 104 or an inductor 114 respectively.

The circuit 100 is also shown in both FIGS. 1A and 1B as having a second portion 106. As illustrated, the second portion 106 in both FIGS. 1A and 1B include functionally equivalent elements. In one implementation, the second portion 106 in the circuit 100 as shown in both FIGS. 1A and 1B contain the same electrical components. In other implementations, the second portion 106 in the circuit 100 as shown in FIGS. 1A and 1B may not contain the same electrical components.

The second portion 106 in both FIGS. 1A and 1B includes switches 108 and 109, which are configured to activate the electrical components received by the first portion 102. For example, the switches 108 and 109 in FIG. 1A are configured to operate independently or concurrently to activate the capacitor 104. Similarly, the switches 108 and 109 in FIG. 1B are configured to operate independently or concurrently to activate the inductor 114. In one implementation, as illustrated in FIG. 1A, the switches 108 and 109 may be connected to a common mode reference at one pole. In another implementation, as illustrated in FIG. 1B, the switches 108 and 109 are not connected to the common mode reference at the pole. The second portion 106 in both FIGS. 1A and 1B may also include chip pads 110. The chip pads 110, as shown in both FIGS. 1A and 1B, may provide external connection points to the circuit 100 from other electronic components in a given system.

The circuit 100 is also shown in both FIGS. 1A and 1B as being acted upon by a control component 120 or 122 respectively. In one implementation, the circuit 100 and the control component (120 or 122) are parts of a system, which is not shown for the sake of simplicity. In one implementation, as shown in both FIGS. 1A and 1B, the control component (120 and 122 respectively) is located outside the circuit 100. In another implementation, the control component (120 and 122 respectively) may be located within the circuit 100. The control component (120 and 122 respectively) as shown in FIGS. 1A and 1B activates switches 108 and 109 used to activate the electrical component received by the first portion 102. For example, the control component 120 activates one or both of the switches 108 and 109 in FIG. 1A to activate the capacitor 104. The control component 122 may also be configured to activate one or both of the switches 108 and 109 in FIG. 1B to activate the inductor 114. A control component is therefore configured to activate the switches 108 and 109 in a different manner when the switch 108 is activating the capacitor 104 than when the switch 108 is activating the inductor 114 The different manner may include a different timing sequence for enabling and disabling the switches 108 and 109, or the like. Further, the control component 120 is configured to adjust the circuit 100 to operate in a first mode as a charge pump type DC/DC converter when the switch 108 is activating the capacitor 104, and the control component 122 is configured to adjust the circuit 100 to operate in a second mode as a buck-boost type DC/DC converter when the switch 108 is activating the inductor 114. In one implementation, the control component 120 is the same as the control component 122. In another implementation, the control component 120 is different than the control component 122.

An exemplary system comprising the circuit 100 and a control component 120 or 122 may be implemented to accommodate operation as either a charge pump type DC/DC converter or a buck-boost type DC/DC converter using the same or a similar printed circuit board (PCB) layout design. In one example, the system comprising the circuit 100 and a control component 120 or 122 is implemented to accommodate operation as either a charge pump type DC/DC converter or a buck-boost type DC/DC converter using the same number of electrical connection pads. In another example, the system comprising the circuit 100 and a control component 120 or 122 is implemented to accommodate operation as either a charge pump type DC/DC converter or a buck-boost type DC/DC converter using the same or similar physical area.

Figure 2A:
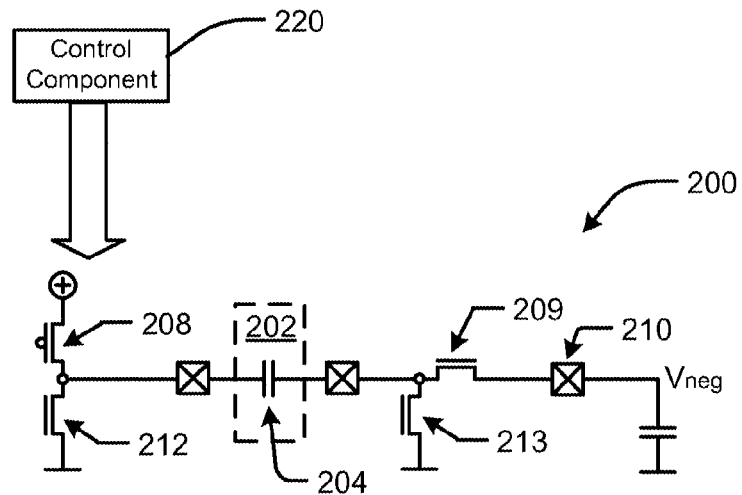
FIG. 2A shows a schematic illustration of an additional example of the system and method according to a first mode.
Figure 2B:
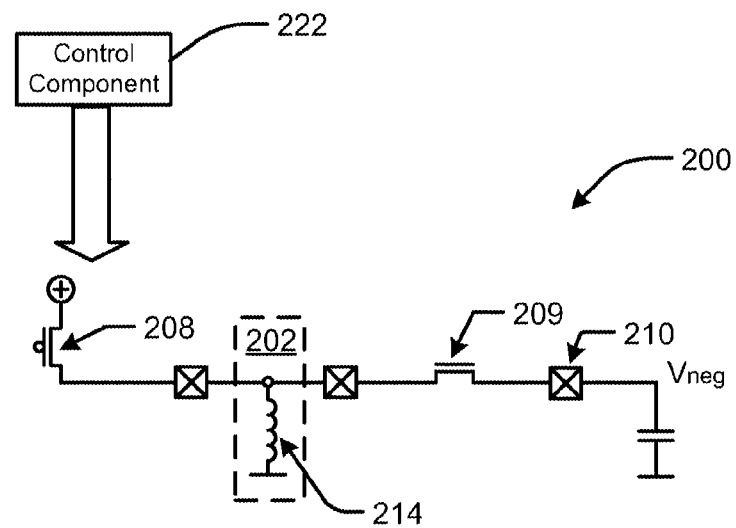
FIG. 2B shows a schematic illustration of the additional example of the system and method according to a second mode.

Switches in the example circuits described above may be implemented with transistors, as illustrated in FIGS. 2A and 2B. In FIGS. 2A and 2B the switches 208 and 209 and secondary switches 212 and 213 are illustrated as Metal-Oxide-Semiconductor Field-Effect Transistors (MOSFET). In other implementations, other types of transistors, or other switching components may be used as switches 208 and 209 and/or secondary switches 212 and 213.

FIGS. 2A and 2B show an example of a configurable electrical circuit 200 in two exemplary operating modes. FIG. 2A shows the electrical circuit 200 operating in a first mode, and FIG. 2B shows the electrical circuit 200 operating in a second mode. The circuit 200 is shown in both FIGS. 2A and 2B as having a portion 202 that is configured to receive an electrical component. The portion 202 is shown as having received a different electrical component in FIG. 2A than in FIG. 2B, resulting in the circuit 200 operating in two different operating modes in the respective figures. In other words, the operating mode of the circuit 200 depends on the electrical component received by the portion 202.

FIG. 2A shows an example of a circuit 200 operating as a charge pump type DC/DC converter. The circuit 200 in FIG. 2A is shown to have received a capacitor 204 at a portion 202. The control component 220 in FIG. 2A is configured to adjust the circuit 200 to operate in a first mode as a charge pump type DC/DC converter. The control component 220 in FIG. 2A is further configured to activate the switches 208 and 209 and the secondary switches 212 and 213, which are configured to enable and disable the capacitor 204. Thus, the control component 220 is configured to activate the switches 208 and 209 and the secondary switches 212 and 213 based on the portion 202 receiving a capacitor. As a result, an output voltage is produced at $V_{neg}$.

FIG. 2B shows an example of a circuit 200 operating as a buck-boost type DC/DC converter. The circuit 200 in FIG. 2B is shown to have received an inductor 214 at the portion 202. The control component 222 in FIG. 2B is configured to adjust the circuit 200 to operate in a second mode as a buck-boost type DC/DC converter. The control component 222 in FIG. 2B is further configured to activate the switches 208 and 209, which are configured to enable and disable the inductor 214. Thus, the control component 222 is configured to activate the switches 208 and 209 based on the portion 202 receiving an inductor. As a result, an output voltage is produced at $V_{neg}$.

A circuit 200 configured to operate in a first mode as a charge pump type DC/DC converter, as shown in FIG. 2A, may be adjusted to operate in a second mode as a buck-boost type DC/DC converter as shown in FIG. 2B. Adjusting the circuit 200 from the first operating mode as a charge pump type DC/DC converter to the second operating mode as a buck-boost type DC/DC converter is made by receiving an inductor 214 at the portion 202 instead of a capacitor 204, and by adjusting the control component 220 to a control component 222, to activate the switches 208 and 209 consistent with operation in the second mode instead of the first mode. In one example, a user may adjust the circuit 200 from the first operating mode to the second operating mode. Adjustment of the control component from a control component 220 to a control component 222 may be accomplished by physical circuit means such as a switch, by firmware means, by software means, or any other means to accomplish the adjustment. Additionally, the secondary switches 212 and 213 are not used for operation in the second mode, and are therefore disabled.

Alternately, a circuit 200 configured to operate in a first mode as a buck-boost type DC/DC converter, as shown in FIG. 2B, may be adjusted to operate in a second mode as a charge pump type DC/DC converter as shown in FIG. 2A. Adjusting the circuit 200 from the first operating mode as a buck-boost type DC/DC converter to the second operating mode as a charge pump type DC/DC converter is made by receiving a capacitor 204 at the portion 202 instead of an inductor 214, and by adjusting the control component 222 to a control component 220, to activate the switches 208 and 209 consistent with operation in the second mode instead of the first mode. In one example, a user may adjust the circuit 200 from the first operating mode to the second operating mode. Adjustment of the control component from a control component 222 to a control component 220 may be accomplished by physical circuit means such as a switch, by firmware means, by software means, or any other means to accomplish the adjustment. Additionally, secondary switches 212 and 213 are not used for operation in the first mode. Thus, although secondary switches 212 and 213 are physically present, they are not enabled nor shown in FIG. 2B. However, secondary switches 212 and 213 are used for operation in the second mode, and are therefore enabled as shown in FIG. 2A.

An example of a circuit 200 may be implemented with integrated circuitry. The circuit 200 may be implemented in such a way that the portion 202 is accessible for adding a capacitor 204 or an inductor 214 using an external connection to the circuit 200. An example of the circuit 200 may be further implemented in a manner to allow the circuit 200 to be designed and manufactured without including the capacitor 204 or inductor 214 in the manufactured product. In this way, the decision of which electrical component (either a capacitor or an inductor) will be added to the circuit 200 is left to the user. Thus, the user may add either a capacitor 204 or an inductor 214 to the portion 202, and configure the circuit 200 to operate as either a charge pump type DC/DC converter or a buck-boost type DC/DC converter respectively, as desired. An exemplary circuit 200 may be implemented to accommodate operation as either a charge pump type DC/DC converter or a buck-boost type DC/DC converter using the same or a similar circuit layout design and/or area. Additionally, an exemplary circuit 200 may be implemented to accommodate operation as either a charge pump type DC/DC converter or a buck-boost type DC/DC converter using the same number of electrical connection pads.

Exemplary Methods

Figure 3:
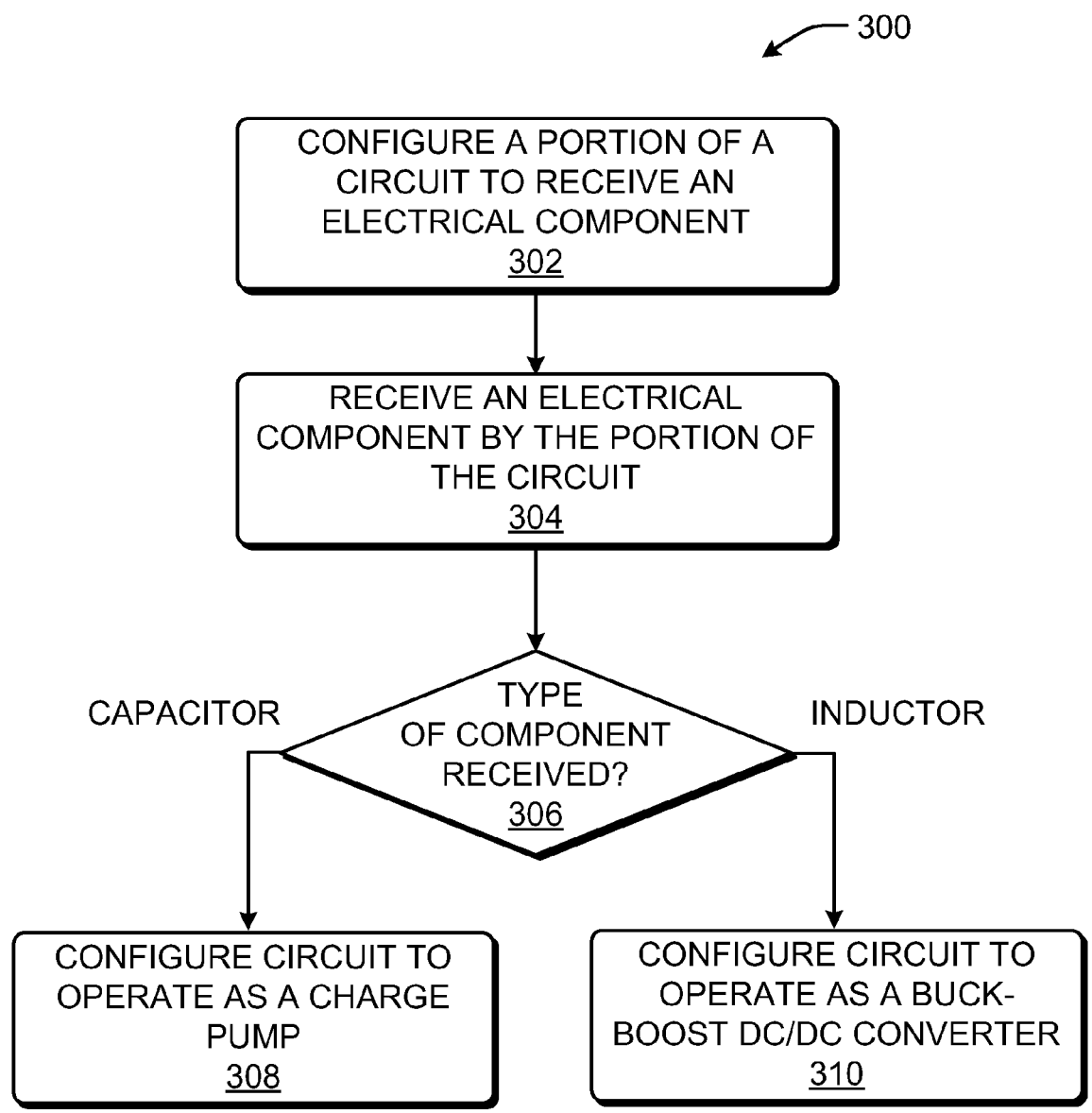
FIG. 3 shows a block diagram of an exemplary method according to the present disclosure.

Exemplary methods 300 according to the above descriptions may be illustrated as shown in FIG. 3. The exemplary methods are illustrated as a collection of blocks in a logical flow graph representing a sequence of operations that can be applied to electronic circuits. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein.

At 302, a portion of a configurable electrical circuit is configured to receive an electrical component. The configurable electrical circuit is configured to operate in either a first mode or in a second mode, and to provide a negative supply voltage in either operating mode. The circuit is further configured to operate in either the first mode or the second mode, depending on the electrical component received.

At 304, the portion of the circuit receives an electrical component. The electrical component received at the first portion is either a capacitor or an inductor. If the electrical component received is a capacitor, the electrical circuit is configured to operate in the first mode. If the electrical component received is an inductor, the electrical circuit is configured to operate in the second mode.

At 306, a determination is made as to whether the electrical component received is a capacitor or an inductor.

If it is determined that the electrical component received at the portion is a capacitor, then at 308 the circuit is configured to operate in the first mode as a charge pump type DC/DC converter.

If it is determined that the electrical component received at the portion is an inductor, then at 310 the circuit is configured to operate in the second mode as a buck-boost type DC/DC converter.

Additionally, in one example, the electrical circuit is controlled using a control component. The control component may be implemented to adjust the circuit for operation in either the first mode or the second mode in conjunction with the capacitor or inductor received. In one implementation, the control component may be located outside the circuit. In another implementation, the control component may be located within the circuit.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. An electrical circuit comprising:
   a first portion configured to receive an electrical component, the first portion having at least two electrical component coupling points, the electrical component to be received between the at least two electrical component coupling points; and
   a second portion comprising at least one switch, the switch configured to activate the electrical component, wherein the electrical circuit is configured to operate in a first mode or in a second mode based on the electrical component received by the first portion and between the at least two electrical component coupling points.

2. The electrical circuit of claim 1, wherein the electrical component is selected from the group comprising: a capacitor and an inductor.

3. The electrical circuit of claim 1, wherein when the electrical component is a capacitor, the electrical circuit is configured to operate in the first mode as a charge pump type DC to DC converter.

4. The electrical circuit of claim 1, wherein when the electrical component is an inductor, the electrical circuit is configured to operate in the second mode as a buck-boost type DC to DC converter.

5. The electrical circuit of claim 1, wherein the circuit is configured to operate in the first mode and the circuit is adjusted to be configured to operate in the second mode by a user.

6. The electrical circuit of claim 1, wherein:
the electrical component is a first component,
the circuit is configured to operate as a charge pump type DC to DC converter with the first component, and
the circuit is adjustable by a user to operate as a buck-boost type DC to DC converter by using a second component instead of the first component.

7. The electrical circuit of claim 6, wherein the electrical circuit is configured to operate as the charge pump type DC to DC converter using a plurality of switches and some of the plurality of switches are disabled when the circuit is adjusted to operate as a buck-boost type DC to DC converter.

8. The electrical circuit of claim 1, wherein:
the electrical component is a first component,
the circuit is configured to operate as a buck-boost type DC to DC converter with the first component, and
the circuit is adjustable by a user to operate as a charge pump type DC to DC converter by using a second component instead of the first component.

9. The electrical circuit of claim 1, wherein the electrical circuit is configured to operate in the first mode using a first number of electrical connection pads and the electrical circuit is configured to operate in the second mode using a second number of electrical connection pads, and the second number of electrical connection pads is equal to the first number of electrical connection pads.

10. A method comprising:
configuring a portion of an integrated circuit to receive an electrical component, the portion having at least two electrical component coupling points, the electrical component to be received between the at least two electrical component coupling points; and
configuring the integrated circuit to operate in a first mode when the electrical component received between the at least two electrical component coupling points is a first electrical component or in a second mode when the electrical component is a second electrical component.

11. The method of claim 10, wherein the first electrical component is a capacitor and the second electrical component is an inductor.

12. The method of claim 10, wherein the first electrical component is a capacitor and the first mode is a charge pump type DC to DC converter mode.

13. The method of claim 10, wherein when the second electrical component is an inductor and the second mode is a buck/boost type DC to DC converter mode.

14. A system comprising:
a first portion of an electrical circuit configured to receive an electrical component between two circuit component connection points capable of receiving a plurality of unique electrical components;
a second portion of the electrical circuit including at least one switch, the switch configured to activate the electrical component, the electrical circuit configured to operate in a first mode or in a second mode based on the electrical component received by the first portion; and
a control component, the control component configured to activate the switch, based on the electrical component received by the first portion.

15. The system according to claim 14, wherein the electrical component is selected from the group comprising: a capacitor and an inductor.

16. The system of claim 14, wherein when the electrical component is a capacitor, the electrical circuit is configured to operate in the first mode as a charge pump type DC to DC converter.

17. The system of claim 14, wherein when the electrical component is an inductor, the electrical circuit is configured to operate in the second mode as a buck-boost type DC to DC converter.

18. The system of claim 14, wherein the electrical circuit is configured to operate in the first mode using a first number of electrical connection pads and the electrical circuit is configured to operate in the second mode using a second number of electrical connection pads, and the second number of electrical connection pads is equal to the first number of electrical connection pads.

19. The system of claim 14, wherein when the electrical circuit is configured to operate in the first mode, the control component is different than when the electrical circuit is configured to operate in the second mode.

* * * * *